(12) United States Patent
Garsuch et al.

(10) Patent No.: US 10,720,668 B2
(45) Date of Patent: Jul. 21, 2020

(54) NON-AQUEOUS ELECTROLYTES FOR LITHIUM-ION BATTERIES COMPRISING ASYMMETRIC BORATES

(71) Applicants: BASF SE, Ludwigshafen am Rhein (DE); Rhode Island Board of Education, State of Rhode Island and Providence Plantations, Providence, RI (US)

(72) Inventors: Arnd Garsuch, Ludwigshafen (DE); Michael Schmidt, Alsbach-Haehnlein (DE); Frederick Francois Chesneau, St. Leon-Rot (DE); Stefano Meini, Munich (DE); Brett Lucht, Kingston, RI (US); Usha Kiran Tottempudi, West Warwick, RI (US); Yingnan Dong, Kingston, RI (US); Michael Rohde, Alzenau (DE); Julien Demeaux, Wakefield, RI (US)

(73) Assignees: BASF SE, Ludwigshafen am Rhein (DE); Rhode Island Board of Education, State of Rhode Island and Providence Plantations, Providence, RI (US)

( * ) Notice: Subject to any disclaimer, the term of this patent is extended or adjusted under 35 U.S.C. 154(b) by 127 days.

(21) Appl. No.: 16/062,900

(22) PCT Filed: Dec. 8, 2016

(86) PCT No.: PCT/EP2016/080286
§ 371 (c)(1),
(2) Date: Jun. 15, 2018

(87) PCT Pub. No.: WO2017/102550
PCT Pub. Date: Jun. 22, 2017

(65) Prior Publication Data
US 2018/0375157 A1    Dec. 27, 2018

(30) Foreign Application Priority Data
Dec. 18, 2015  (EP) .................................... 15201421

(51) Int. Cl.
| | | |
|---|---|---|
| *H01M 10/0569* | (2010.01) | |
| *H01M 10/0567* | (2010.01) | |
| *H01M 4/38* | (2006.01) | |
| *H01M 10/052* | (2010.01) | |
| *H01M 4/58* | (2010.01) | |
| *H01M 4/583* | (2010.01) | |
| *H01M 10/0525* | (2010.01) | |

(Continued)

(52) U.S. Cl.
CPC ........ *H01M 10/0569* (2013.01); *H01M 4/386* (2013.01); *H01M 4/387* (2013.01); *H01M 4/583* (2013.01); *H01M 4/5825* (2013.01); *H01M 10/052* (2013.01); *H01M 10/0525* (2013.01); *H01M 10/0567* (2013.01); *H01M 4/587* (2013.01); *H01M 2004/027* (2013.01); *H01M 2004/028* (2013.01); *H01M 2300/0028* (2013.01)

(58) Field of Classification Search
CPC .... H01M 4/386; H01M 4/387; H01M 4/5825; H01M 4/583; H01M 10/0569; H01M 10/052; H01M 10/0525; H01G 9/038; C07F 5/04; C01D 15/00
USPC ......................................................... 429/188
See application file for complete search history.

(56) References Cited

U.S. PATENT DOCUMENTS

| | | | | |
|---|---|---|---|---|
| 7,572,554 B2* | 8/2009 | Koike | ............... | H01M 10/0525 429/329 |
| 7,718,321 B2* | 5/2010 | Yoon | ................. | H01M 10/0568 429/188 |

(Continued)

FOREIGN PATENT DOCUMENTS

| | | | |
|---|---|---|---|
| DE | 10 2006 048 036 A1 | | 4/2007 |
| JP | 2014182889 A | * | 9/2014 |

(Continued)

OTHER PUBLICATIONS

Dong et al, "Effect of Lithium Borate Additives on Cathode Film Formation in LiNi0.5Mn1.5O4/Li Cells", Applied Materials and Interfaces 9, 20467-20475 (2017) (Year: 2017).*

(Continued)

*Primary Examiner* — Amanda C. Walke
(74) *Attorney, Agent, or Firm* — Oblon, McClelland, Maier & Neustadt, L.L.P.

(57) ABSTRACT

An electrolyte composition (A) containing at least one aprotic organic solvent and at least one compound of formula (I) wherein $A^+$ is selected from $Li^+$, $Na^+$, $K^+$, $Cs^+$, and ammonium; is a bidentate radical derived from a (hetero) aromatic 1,2-, 1,3- or 1,4-diol, from a (hetero)aromatic 1,2-, 1,3- or 1,4-dicarboxylic acid or from a (hetero)aromatic 1,2-, 1,3- or 1,4-hydroxycarboxylic acid by abstracting the two H atoms of pairs of adjacent OH groups; and $R^1$ and $R^2$ are organic substituents.

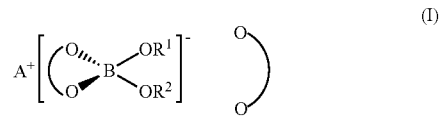

18 Claims, No Drawings

(51) Int. Cl.
*H01M 4/587* (2010.01)
*H01M 4/02* (2006.01)

(56) References Cited

U.S. PATENT DOCUMENTS

| | | | |
|---|---|---|---|
| 8,283,074 B2* | 10/2012 | Amine | H01G 9/038 |
| | | | 252/62.2 |
| 9,012,094 B2* | 4/2015 | Tikhonov | H01M 10/0569 |
| | | | 429/326 |
| 9,300,000 B2* | 3/2016 | Jansen | H01M 8/188 |
| 9,748,605 B2* | 8/2017 | Schmidt | C07D 207/04 |
| 10,283,814 B2* | 5/2019 | Kramer | H01M 10/052 |
| 2001/0033964 A1* | 10/2001 | Heider | C07F 5/04 |
| | | | 429/188 |
| 2004/0202912 A1* | 10/2004 | Nishiura | C08G 65/22 |
| | | | 429/330 |
| 2006/0199080 A1* | 9/2006 | Amine | H01M 4/366 |
| | | | 429/326 |
| 2009/0062497 A1* | 3/2009 | Aul | C07F 5/04 |
| | | | 528/8 |
| 2010/0143806 A1* | 6/2010 | Dietz | C07F 5/022 |
| | | | 429/338 |
| 2013/0026854 A1* | 1/2013 | Wang | G11B 7/24038 |
| | | | 307/147 |
| 2014/0193707 A1 | 7/2014 | Schmidt et al. | |
| 2014/0335406 A1* | 11/2014 | An | H01M 10/0525 |
| | | | 429/200 |

FOREIGN PATENT DOCUMENTS

| | | | |
|---|---|---|---|
| WO | WO 98/07729 A1 | 2/1998 | |
| WO | WO 2011/024420 A1 | 3/2011 | |
| WO | WO 2013/026854 A1 | 2/2013 | |
| WO | WO 2015/007659 A1 | 1/2015 | |

OTHER PUBLICATIONS

Machine translation of WO 2011/024420 (no date).*
International Search Report dated Feb. 10, 2017 in PCT/EP2016/080286, 4 pages.
Extended European Search Report dated Mar. 2, 2016 in European Patent Application No. 15201421.3, 3 pages.
Dalavi, S., et al., "Effect of Added LiBOB on High Voltage (LiNi0.5Mn1.5O4) Spinel Cathodes", Electrochemical Solid-State Letters, vol. 15 No. 2, 2012, pp. A28-A31.
Elazari, R., et al., "Rechargeable lithiated silicon-sulfur (SLS) battery prototypes", Electrochemistry Communications, vol. 14 No. 1, Jan. 2012, pp. 21-24.
Funck, E., "Metall-Ligand-Schwingungen in den Infrarot-Absorptionsspektren von Komplexen mit leichten Zentralatomen und Sauerstoffkoordination: II. Bor- und Kohlenstoffverbindungen" (with English abstract), Berichte der Bunsengesellschaft für physikalische Chemi, XP 055251211, vol. 71 No. 2, Mar. 1, 1967, p. 170-181.
Xu, M., et al., "Improved Performance of High Voltage Graphite/ LiNi0.5Mn1.5O4 Batteries with Added Lithium Tetramethyl Borate", Electrochemical Solid-State Electrochemistry Letters, vol. 4 No. 8, 2015, pp. A83-A86.
Xu, M., et al., "Improving the Performance of Graphite/ LiNi0. 5Mn1.5O4 Cells at High Voltage and Elevated Temperature with Added Lithium Bis(oxalato) Borate (LiBOB)", Electrochemical Solid-State Letters, vol. 160 No. 11, 2013, pp. A2005-A2013.

* cited by examiner

NON-AQUEOUS ELECTROLYTES FOR LITHIUM-ION BATTERIES COMPRISING ASYMMETRIC BORATES

The present invention relates to an electrolyte composition containing at least one asymmetric borate salt as defined below in formula (I), to the use of such asymmetric borate salts as additives in electrolyte compositions for electrochemical cells and to electrochemical cells comprising such electrolyte compositions.

Storing electrical energy is a subject of still growing interest. Efficient storage of electric energy would allow electric energy to be generated when it is advantageous and used when needed. Secondary electrochemical cells are well suited for this purpose due to their reversible conversion of chemical energy into electrical energy and vice versa (rechargeability). Secondary lithium batteries are of special interest for energy storage since they provide high energy density and specific energy due to the small atomic weight of the lithium ion, and the high cell voltages that can be obtained (typically 3 to 5 V) in comparison with other battery systems. For that reason, these systems have become widely used as a power source for many portable electronics such as cellular phones, laptop computers, mini-cameras, etc.

In secondary lithium batteries like lithium ion batteries non-aqueous solvents like organic carbonates, ethers, esters and ionic liquids are used. Most state of the art lithium ion batteries in general comprise not a single solvent but a solvent mixture of different organic aprotic solvents. The main electrolyte salt in current state electrolyte compositions for lithium-ion batteries is $LiPF_6$. $LiPF_6$ is very susceptible to the reaction with water and even trace amounts of water lead to the generation of hydrogen fluoride. Different other lithium salts were investigated and synthesized in order to substitute or to complement $LiPF_6$. One class of such other lithium salts are organo borate salts.

WO 98/07729 A1 describes the use of symmetric lithium borate salts with bidentate organic ligands like lithium bis[1,2-benzenediolato(2-)O,O] borate in electrolyte compositions for electrochemical cells and a process for preparation of such lithium salts.

WO 2015/007659 refers to electrolyte compositions containing lithium borate complexes with unidentate organic ligands for electrochemical cells.

Borates are known to produce an SEI on the anode surface as well as to undergo anodic oxidation to protective surface films on the cathode surfaces, thus mitigating further electrolyte oxidation and transition metal leaching from the cathode active material, as described e.g. in Swapnil Dalavi, Mengqing Xu, Brandon Knight and Brett L. Lucht *Electrochem. Solid State Lett.* 2012, 15, A28-A31, Mengqing Xu, Liu Zhou, Yingnan Dong, Yanjing Chen, Arnd Garsuch, and Brett L. Lucht *J. Electrochem. Soc.* 2013, 160, A2005-A2013, and Mengqing Xu, Liu Zhou, Yingnan Dong, Usha Tottempudi, Julien Demeaux, Arnd Garsuch, and Brett L. Lucht *ECS Electrochemistry Lett.* 2015, 4, A83-A86. However, some of the borates do not improve cell efficiency while other borates can lead to additional gassing and related increases in internal cell pressure. Thus the development of improved borates is necessary.

It is the object of the present invention to provide further borate salts for use in electrolyte compositions and to provide electrochemical cells exhibiting improved electrochemical performance at high temperatures.

This object is achieved by an electrolyte composition (A) containing at least one aprotic organic solvent and at least one compound of formula (I)

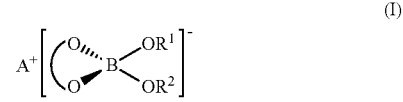

(I)

wherein
$A^+$ is selected from $Li^+$, $Na^+$, $K^+$, $Cs^+$, and ammonium;

is a bidentate radical derived from a (hetero)aromatic 1,2-, 1,3- or 1,4-diol, from a (hetero)aromatic 1,2- or 1,3- or 1,4-dicarboxylic acid or from a (hetero)aromatic 1,2-, 1,3- or 1,4-hydroxycarboxylic acid by abstracting the two H atoms of pairs of adjacent OH groups; and $R^1$ and $R^2$ are selected independently from $C_1$ to $C_{10}$ alkyl, $C_2$ to $C_{10}$ alkenyl, $C_2$ to $C_{10}$ alkynyl, $C_3$ to $C_{10}$ cycloalkyl, and $C_5$ to $C_{14}$ (hetero)aryl, wherein alkyl, alkenyl, alkynyl, cycloalkyl, and (hetero)aryl may be substituted by one or more substituents selected from F, CN, and optionally fluorinated groups selected from $C_1$ to $C_4$ alkyl, $C_2$ to $C_4$ alkenyl, $C_2$ to $C_4$ alkynyl, phenyl, and benzyl, and wherein one or more $CH_2$-groups of alkyl, alkenyl, and alkynyl, which are not bound to an oxygen atom, may be replaced by O.

This object is also accomplished by the use of compounds of formula (I) as additives in electrolyte compositions for electrochemical cells, in particular as additives for high voltage cathode protection. The borate additives are sacrificially oxidized on the cathode surface to generate a cathode passivation layer similar to the SEI on the anode.

Rechargeable lithium ion batteries comprising an electrolyte composition containing an asymmetric borate of formula (I) show improved high temperature performance, e.g. improved specific capacities and coulomb efficiencies and reduced impedance.

In the following the invention is described in detail.

One aspect of the invention relates to electrolyte compositions (A) containing at least one compound of formula (I)

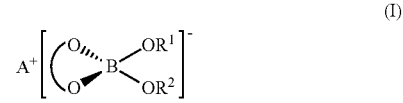

(I)

wherein
$A^+$ is selected from $Li^+$, $Na^+$, $K^+$, $Cs^+$, and ammonium;

is a bidentate radical derived from a (hetero)aromatic 1,2-, 1,3- or 1,4-diol, from a (hetero)aromatic 1,2- or 1,3- or 1,4-dicarboxylic acid or from a (hetero)aromatic 1,2-, 1,3- or 1,4-hydroxycarboxylic acid by abstracting the two H atoms of pairs of adjacent OH groups; and $R^1$ and $R^2$ are selected independently from $C_1$ to $C_{10}$ alkyl, $C_2$ to $C_{10}$ alkenyl, $C_2$ to $C_{10}$ alkynyl, $C_3$ to $C_{10}$ cycloalkyl, and $C_5$ to $C_{14}$ (hetero)aryl, wherein alkyl, alkenyl, alkynyl, cycloalkyl, and (hetero)aryl may be substituted by one or more substituents selected from F, CN, and optionally fluorinated groups selected from $C_1$ to $C_4$ alkyl, $C_2$ to $C_4$ alkenyl, $C_2$ to $C_4$ alkynyl, phenyl, and benzyl, and wherein one or more $CH_2$-groups of alkyl, alkenyl, and alkynyl, which are not bound to an oxygen atom, may be replaced by O. Preferably none of the $CH_2$-groups of alkyl, alkenyl, and alkynyl, which are not bound to an oxygen atom, are replaced by O.

The compounds of formula (I) are also referred to as asymmetric borate salts.

The bidentate radical

is derived from the (hetero)aromatic 1,2-, 1,3- or 1,4-diol, 1,2-, 1,3- or 1,4-dicarboxylic acid or 1,2-, 1,3- or 1,4-hydroxycarboxylic acid by abstracting the two H atoms of pairs of adjacent OH groups. "Adjacent OH groups" means the two hydroxyl groups present in the respective functional groups in 1,2-, 1,3- or 1,4-position, i.e. the two OH-groups present in the two carboxylic acid groups of a 1,2-, 1,3- or 1,4-dicarboxylic acid, the two OH-groups present in a 1,2-, 1,3- or 1,4-diol or the two OH-groups present in the carboxylic acid group and the alcoholic OH-group of a 1,2-, 1,3- or 1,4-hydroxycarboxylic acid.

The term "(hetero)aromatic 1,2-, 1,3- or 1,4-diol" as used herein means an aromatic or heteroaromatic core structure to which two OH-groups are attached in 1,2-, 1,3- or 1,4-position. Preferably the aromatic or heteroaromatic core structure comprises 6 to 12 C-atoms wherein in case of the heteroaromatic core structure one or more C-atoms are replaced by hetero atoms selected from N, S, and O. Examples of such (hetero)aromatic core structures are benzene, pyridine, biphenyl and naphtalene. The (hetero)aromatic core structure may be substituted additionally by one or more substituents, e.g it may be substituted additionally by substituents selected from F, CN, optionally fluorinated $C_1$ to $C_6$ alkyl, which may contain one or more ether groups. Examples of (hetero)aromatic 1,2-, 1,3- or 1,4-diols are 1,2-benzenediol (catechol), 1,3-benzenediol (resorcin),

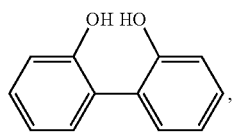

2,3-pyridinediol, 2,4-pyridinediol, and

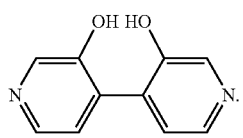

A preferred (hetero)aromatic diol is 1,2-benzenediol (catechol).

The term "(hetero)aromatic 1,2-, 1,3- or 1,4-dicarboxylic acid" as used herein means an aromatic or heteroaromatic core structure to which two carboxylic acid groups are attached in 1,2-, 1,3- or 1,4-position. The (hetero)aromatic core structure may be substituted additionally by one or more substituents, e.g substituents selected from F, CN, optionally fluorinated $C_1$ to $C_6$ alkyl, which may contain one or more ether groups. Examples of such (hetero)aromatic 1,2-, 1,3- or 1,4-dicarboxylic acids are benzene-1,2-dicarboxylic acid (phthalic acid), pyridine-2,3-dicarboxylic acid, pyridine-2,4-dicarboxylic acid, and . . . . A preferred (hetero)aromatic dicarboxylic acid is benzene-1,2-dicarboxylic acid (phthalic acid).

The term "(hetero)aromatic 1,2-, 1,3- or 1,4-hydroxycarboxylic acid" as used herein means an aromatic or heteroaromatic core structure to which one carboxylic acid group and one hydroxyl group are attached in 1,2-, 1,3- or 1,4-position. The (hetero)aromatic core structure may be substituted additionally by one or more substituents, e.g substituents selected from F, CN, optionally fluorinated $C_1$ to $C_6$ alkyl, which may contain one or more ether groups. Examples of such (hetero)aromatic 1,2-, 1,3- or 1,4-hydroxycarboxylic acids are 2-hydroxybenzoic acid (salicylic acid), 3-hydroxybenzoic acid,

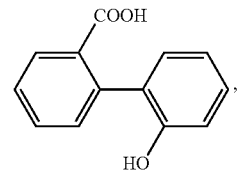 [SMILES: O=C(O)c1ccccc1-c1ccccc1O]

pyridine-2-hydroxy-3-carboxylic acid, pyridine-3-hydroxy-4-carboxylic acid, pyridine-2-hydroxy-4-carboxylic acid, pyridine-4-hydroxy-2-carboxylic acid, and

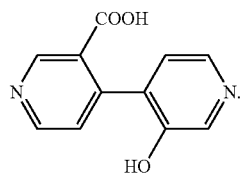

A preferred hydroxycarboxylic acid is salicylic acid.

Preferably the bidentate

is a bidentate radical derived from a hydroxycarboxylic acid or a diol.

The term "$C_1$ to $C_{10}$ alkyl" as used herein means a straight or branched saturated hydrocarbon group with 1 to 10 carbon atoms having one free valence and includes, e.g., methyl, ethyl, n-propyl, isopropyl, n-butyl, isobutyl, tert-butyl, n-pentyl, iso-pentyl, 2-pentyl, 2,2-dimethylpropyl, n-hexyl, iso-hexyl, 2-ethyl hexyl, n-heptyl, iso-heptyl, n-octyl, iso-octyl, 1,1,3,3-tetramethylbutyl, n-nonyl, n-decyl and the like. Preferred are $C_1$ to $C_6$ alkyl groups, more preferred are $C_1$ to $C_4$ alkyl groups, and most preferred are methyl, ethyl, iso-propyl, n-butyl, and i-butyl.

The term "$C_3$ to $C_{10}$ cycloalkyl" as used herein means a saturated 3- to 10-membered hydrocarbon cycle or polycycle having one free valence. Examples of $C_3$ to $C_{10}$ (hetero)cycloalkyl are cyclopropyl, oxiranyl, cyclopentyl, pyrrolidyl, cyclohexyl, piperidyl, morpholinyl, cycloheptyl, 1-adamantyl, and 2-adamantyl. Preferred are $C_6$ to $C_{10}$ cycloalkyl groups, in particular preferred is cyclohexyl.

The term "$C_2$ to $C_{10}$ alkenyl" as used herein refers to an unsaturated straight or branched hydrocarbon group with 2 to 10 carbon atoms having one free valence. Unsaturated means that the alkenyl group contains at least one C—C double bond. $C_2$ to $C_{10}$ alkenyl includes for example ethenyl, 1-propenyl, 2-propenyl, 1-n-butenyl, 2-n-butenyl, iso-butenyl, 1-pentenyl, 1-hexenyl, 1-heptenyl, 1-octenyl, 1-nonenyl, 1-decenyl and the like. Preferred are $C_2$ to $C_8$ alkenyl groups, more preferred are $C_2$ to $C_6$ alkenyl groups, even more preferred are $C_2$ to $C_4$ alkenyl groups and in particular ethenyl and 1-propen-3-yl (allyl).

The term "$C_3$ to $C_{10}$ cycloalkenyl" as used herein refers to an unsaturated 3- to 7-membered hydrocarbon cycle having one free valence. $C_3$ to $C_{10}$ (hetero)cycloalkenyl includes for example cyclopentene and cyclohexene. Preferred are $C_3$ to $C_6$ (hetero)cycloalkenyl.

The term "$C_2$ to $C_{10}$ alkynyl" as used herein refers to an unsaturated straight or branched hydrocarbon group with 2 to 10 carbon atoms having one free valence, wherein the hydrocarbon group contains at least one C—C triple bond. $C_2$ to $C_{10}$ alkynyl includes for example ethynyl, 1-propynyl, 2-propynyl, 1-n-butynyl, 2-n-butynyl, 1-pentynyl, 1-hexynyl, 1-heptynyl, 1-octynyl, 1-nonynyl, 1-decynyl and the like. Preferred are $C_2$ to $C_8$ alkynyl, more preferred are $C_2$ to $C_6$ alkynyl, even more preferred are $C_2$ to $C_4$ alkynyl, in particular preferred are ethynyl and 1-propyn-3-yl (propargyl).

The term "$C_5$ to $C_{14}$ (hetero)aryl" as used herein denotes an aromatic 5- to 14-membered hydrocarbon cycle or bicycle having one free valence wherein one or more of the C-atoms of the aromatic cycle(s) may be replaced independently from each other by a heteroatom selected from N, S, O and P. Examples of $C_5$ to $C_{14}$ (hetero)aryl are furanyl, pyrrolyl, pyrazolyl, thienyl, pyridinyl, imidazolyl, phenyl, and naphtyl. Preferred is phenyl.

$R^1$ and $R^2$ may be equal or different, preferably $R^1$ and $R^2$ are equal.

Preferably $R^1$ and $R^2$ are selected from $C_1$ to $C_{10}$ alkyl, which may be substituted by one or more substituents selected from F and CN and wherein one or more $CH_2$-groups of the alkyl, which are not bound to an oxygen atom, may be substituted by O, more preferred from $C_1$ to $C_6$ alkyl, which may be substituted by one or more substituents selected from F and CN and wherein one or more $CH_2$-groups of the alkyl, which are not bound to an oxygen atom, may be substituted by O, even more preferred from $C_1$ to $C_4$ alkyl, which may be substituted by one or more substituents selected from F and CN and wherein one or more $CH_2$-groups of the alkyl, which are not bound to an oxygen atom, may be substituted by O. Preferably none of the $CH_2$-groups of alkyl, alkenyl, and alkynyl, which are not bound to an oxygen atom, are replaced by O. For example, $R^1$ and $R^2$ may be selected from methyl, monofluoromethyl, trifluoromethyl, ethyl, 2-fluoroethyl, 2,2,2-trifluoroethyl, n-propyl, i-propyl, n-butyl and i-butyl. Most preferred $R^1$ and $R^2$ are methyl.

The bidentate radical is preferably

derived from a (hetero)aromatic 1,2- or 1,3-diol, from a (hetero)aromatic 1,2- or 1,3-dicarboxylic acid or from a (hetero)aromatic 1,2- or 1,3-hydroxycarboxylic acid by abstracting the two H atoms of pairs of adjacent OH groups, more preferred the bidentate radical

is derived from a (hetero)aromatic 1,2-diol, from a (hetero)aromatic 1,2-dicarboxylic acid or from a (hetero)aromatic 1,2-hydroxycarboxylic acid, most preferred the bidentate radical

is derived from catechol, salicylic acid or phthalic acid, in particular from catechol and salicylic acid.

The borate anion may be selected from anions wherein the bidentate radical

is derived from a (hetero)aromatic 1,2-diol, from a (hetero)aromatic 1,2-dicarboxylic acid or from a (hetero)aromatic 1,2-hydroxycarboxylic acid and wherein $R^1$ and $R^2$ may be equal or different, preferably equal, and are selected from $C_1$ to $C_{10}$ alkyl, which may be substituted by one or more substituents selected from F and CN and wherein one or more $CH_2$-groups of the alkyl, which are not bound to an oxygen atom, may be substituted by O, more preferred from $C_1$ to $C_6$ alkyl, which may be substituted by one or more substituents selected from F and CN and wherein one or more $CH_2$-groups of the alkyl, which are not bound to an oxygen atom, may be substituted by O, even more preferred from $C_1$ to $C_4$ alkyl, which may be substituted by one or more substituents selected from F and CN and wherein one or more $CH_2$-groups of the alkyl, which are not bound to an oxygen atom, may be substituted by O, e.g. $R^1$ and $R^2$ are selected from methyl, trifluoromethyl, ethyl, 2,2,2-trifluoroethyl, n-propyl, i-propyl, n-butyl and i-butyl, and most preferred $R^1$ and $R^2$ are methyl.

The borate anion may also be selected from anions wherein the bidentate radical

is derived from a (hetero)aromatic 1,3-diol, from a (hetero)aromatic 1,3-dicarboxylic acid or from a (hetero)aromatic 1,3-hydroxycarboxylic acid and wherein $R^1$ and $R^2$ may be equal or different, preferably equal, and are selected from $C_1$ to $C_{10}$ alkyl, which may be substituted by one or more substituents selected from F and CN and wherein one or more $CH_2$-groups of the alkyl, which are not bound to an oxygen atom, may be substituted by 0, more preferred from $C_1$ to $C_6$ alkyl, which may be substituted by one or more substituents selected from F and CN and wherein one or more $CH_2$-groups of the alkyl, which are not bound to an oxygen atom, may be substituted by O, even more preferred from $C_1$ to $C_4$ alkyl, which may be substituted by one or more substituents selected from F and CN and wherein one or more $CH_2$-groups of the alkyl, which are not bound to an oxygen atom, may be substituted by O, e.g. $R^1$ and $R^2$ are selected from methyl, trifluoromethyl, ethyl, 2,2,2-trifluoroethyl, n-propyl, i-propyl, n-butyl and i-butyl, and most preferred $R^1$ and $R^2$ are methyl.

A preferred anion is catechol dimethyl borate

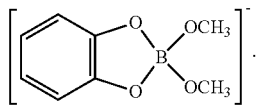

$A^+$ is selected from $Li^+$, $Na^+$, $K^+$, $Cs^+$, and ammonium, preferably $A^+$ is selected from $Li^+$ and ammonium, most preferred $A^+$ is $Li^+$ Ammonium cations are usually quaternary organic $[NR^3R^4R^5R^6]^+$ wherein $R^3$, $R^4$, $R^5$, and $R^6$ are selected independently from H, $C_1$ to $C_{10}$ alkyl, $C_2$ to $C_{10}$ alkenyl, $C_2$ to $C_{10}$ alkynyl, $C_3$ to $C_{10}$ cycloalkyl, and $C_5$ to $C_{14}$ (hetero)aryl, and wherein two of $R^3$, $R^4$, $R^5$, and $R^6$ are linked and jointly selected from a 4- to 5-membered hydrocarbon group forming together with the central N-atom a five- or six-membered heterocycle wherein one or more members of the 4- to 5-membered hydrocarbon group may be replaced by one or more O, S or NR'. R' may be selected from H and $C_1$-$C_{10}$ alkyl. In case $A^+$ is ammonium, it is preferably selected form $[NR^3R^4R^5R^6]^+$ wherein $R^3$, $R^4$, $R^5$, and $R^6$ are selected independently from H and $C_1$ to $C_4$ alkyl, wherein two of $R^3$, $R^4$, $R^5$, and $R^6$ are linked and jointly selected from a 4- to 5-membered hydrocarbon group forming together with the central N-atom a five- or six-membered heterocycle wherein one or more members of the 4- to 5-membered hydrocarbon group may be replaced by one or more O, S or NR' with R' may be selected from H and $C_1$-$C_4$ alkyl. Examples for ammonium cations are $NH_4^+$ tetramethylammonium, tetraethylammonium, dimethylpiperidinium, dimethylpyrrolidinium, dimethylpyrazolium, and the like.

Preferred compounds of formula (I) are those wherein the bidentate radical

is derived from a (hetero)aromatic 1,2-diol, from a (hetero)aromatic 1,2-dicarboxylic acid or from a (hetero)aromatic 1,2-hydroxycarboxylic acid;
$R^1$ and $R^2$ are each independently selected from $C_1$ to $C_4$ alkyl, preferably $R^1$ and $R^2$ are methyl;

$A^+$ is selected from $Li^+$ and ammonium. Ammonium is preferably $[NR^3R^4R^5R^6]^+$ wherein $R^3$, $R^4$, $R^5$, and $R^6$ are selected independently from H and $C_1$ to $C_4$ alkyl, wherein two of $R^3$, $R^4$, $R^5$, and $R^6$ are linked and jointly selected from a 4- to 5-membered hydrocarbon group forming together with the central N-atom a five- or six-membered heterocycle wherein one or more members of the 4- to 5-membered hydrocarbon group may be replaced by one or more O, S or NR' with R' may be selected from H and $C_1$-$C_4$ alkyl. It is preferred within this embodiment, that $A^+$ is $Li^+$.

Also preferred are compounds of formula (I) are those wherein the bidentate radical

is derived from catechol, salicylic acid and phthalic acid;
$R^1$ and $R^2$ are each independently selected from $C_1$ to $C_4$ alkyl, e.g. methyl, ethyl, n-propyl, i-propyl, n-butyl and i-butyl, preferably $R^1$ and $R^2$ are methyl;

$A^+$ is selected from $Li^+$ and ammonium. Ammonium is preferably $[NR^3R^4R^5R^6]^+$ wherein $R^3$, $R^4$, $R^5$, and $R^6$ are selected independently from H and $C_1$ to $C_4$ alkyl, wherein two of $R^3$, $R^4$, $R^5$, and $R^6$ are linked and jointly selected from a 4- to 5-membered hydrocarbon group forming together with the central N-atom a five- or six-membered heterocycle wherein one or more members of the 4- to 5-membered hydrocarbon group may be replaced by one or more O, S or NR' with R' may be selected from H and $C_1$-$C_4$ alkyl. It is preferred within this embodiment, that $A^+$ is $Li^+$.

Preferred are also compounds of formula (I) are those wherein the bidentate radical

is derived from catechol;
$R^1$ and $R^2$ are each independently selected from $C_1$ to $C_4$ alkyl, e.g. methyl, ethyl, n-propyl, i-propyl, n-butyl and i-butyl, preferably methyl, ethyl, n-propyl and i-propyl, preferably $R^1$ and $R^2$ are methyl;

$A^+$ is selected from $Li^+$ and ammonium. Ammonium is preferably $[NR^3R^4R^5R^6]^+$ wherein $R^3$, $R^4$, $R^5$, and $R^6$ are selected independently from H and $C_1$ to $C_4$ alkyl, wherein two of $R^3$, $R^4$, $R^5$, and $R^6$ are linked and jointly selected from a 4- to 5-membered hydrocarbon group forming together with the central N-atom a five- or six-membered heterocycle wherein one or more members of the 4- to 5-membered hydrocarbon group may be replaced by one or more 0, S or NR' with R' may be selected from H and $C_1$-$C_4$ alkyl. It is preferred within this embodiment, that $A^+$ is $Li^+$.

Examples of the compounds of formula (I) are lithium catechol dimethyl borate, tetramethylammonium catechol dimethyl borate, sodium catechol dimethyl borate, potassium catechol dimethyl borate, lithium catechol diisopropyl borate, sodium catechol diisopropyl borate, potassium catechol diisopropyl borate, and tetramethylammonium catechol diisopropyl borate.

The compounds of formula (I) can be prepared in analogy to Mengqing Xu, Liu Zhou, Yingnan Dong, Usha Tottempudi, Julien Demeaux, Arnd Garsuch, and Brett L. Lucht *ECS Electrochemistry Lett.* 2015, 4, A83-A86.

The total concentration of the at least one compound of formula (I), based on the total weight of the electrolyte composition, in the electrolyte composition (A) is usually in the range of 0.005 to 10 wt.-%, based on the total weight of the electrolyte composition, preferably in the range of 0.01 to 5 wt.-%, more preferred in the range of 0.025 to 3 wt.-%, and most preferred in the range of 0.05 to 2 wt.-%, based on the total weight of the electrolyte composition.

According to another aspect of the invention the asymmetric borates, as described above or as described as being preferred, are used as additives in electrolyte compositions for electrochemical cells, preferably the asymmetric borates are used as high voltage cathode protection additives additives. It is preferred to use the asymmetric borates as additives in non-aqueous electrolyte compositions, more preferred the asymmetric borates are used as additives in electrolyte compositions for electrochemical cells, even more preferred in electrolyte compositions for lithium batteries, most preferred for lithium ion batteries.

Accordingly, when an asymmetric borate is used as additive in electrolyte compositions, the total concentration of the asymmetric borate(s) in the electrolyte compositions is typically 0.005 to 10 wt.-%, preferred 0.01 to 5 wt.-%, more preferred 0.025 to 3 wt.-% and most preferred 0.05 to 2 wt.-%, based on the total weight of the electrolyte composition. Usually asymmetric borate(s) are added to the electrolyte composition in the desired amount during or after manufacture of the electrolyte composition.

The electrolyte composition (A) preferably contains at least one aprotic organic solvent, more preferred at least two aprotic organic solvents. According to one embodiment the electrolyte composition may contain up to ten aprotic organic solvents.

The at least one aprotic organic solvent is preferably selected from cyclic and acyclic organic carbonates, di-$C_1$-$C_{10}$-alkylethers, di-$C_1$-$C_4$-alkyl-$C_2$-$C_6$-alkylene ethers and polyethers, cyclic ethers, cyclic and acyclic acetales and ketales, orthocarboxylic acids esters, cyclic and acyclic esters of carboxylic acids, cyclic and acyclic sulfones, and cyclic and acyclic nitriles and dinitriles.

More preferred the at least one aprotic organic solvent is selected from cyclic and acyclic carbonates, di-$C_1$-$C_{10}$-alkylethers, di-$C_1$-$C_4$-alkyl-$C_2$-$C_6$-alkylene ethers and polyethers, cyclic ethers, cyclic and acyclic acetales and ketales, and cyclic and acyclic esters of carboxylic acids, even more preferred the electrolyte composition contains at least one aprotic organic solvent selected from cyclic and acyclic carbonates, and most preferred the electrolyte composition contains at least two aprotic organic solvents selected from cyclic and acyclic carbonates, in particular preferred the electrolyte composition contains at least one aprotic solvent selected from cyclic carbonates and at least one aprotic organic solvent selected from acyclic carbonates.

The aprotic organic solvents may be partly fluorinated. "Partly fluorinated" means, that one or more H of the respective molecule is substituted by F. The at least one solvent may be selected from partly halogenated and non-halogenated aprotic organic solvents i.e. the electrolyte composition may contain a mixture of partly halogenated and non-halogenated aprotic organic solvents.

Examples of cyclic carbonates are ethylene carbonate (EC), propylene carbonate (PC) and butylene carbonate (BC), wherein one or more H in may be substituted by F and/or an $C_1$ to $C_4$ alkyl group, e.g. 4-methyl ethylene carbonate, monofluoroethylene carbonate (FEC), and cis- and trans-difluoroethylene carbonate. Preferred cyclic carbonates are ethylene carbonate, monofluoroethylene carbonate, and propylene carbonate, in particular ethylene carbonate.

Examples of acyclic carbonates are di-$C_1$-$C_{10}$-alkylcarbonates, wherein each alkyl group is selected independently from each other, preferred are di-$C_1$-$C_4$-alkylcarbonates. Examples are e.g. diethyl carbonate (DEC), ethyl methyl carbonate (EMC), dimethyl carbonate (DMC), and methylpropyl carbonate. Preferred acyclic carbonates are diethyl carbonate (DEC), ethyl methyl carbonate (EMC), and dimethyl carbonate (DMC).

In one embodiment of the invention the electrolyte composition (A) contains mixtures of acyclic organic carbonates and cyclic organic carbonates at a ratio by weight of from 1:10 to 10:1, preferred of from 3:7 to 8:2.

According to the invention each alkyl group of the di-$C_1$-$C_{10}$-alkylethers is selected independently from the other. Examples of di-$C_1$-$C_{10}$-alkylethers are dimethylether, ethylmethylether, diethylether, methylpropylether, di isopropylether, and di-n-butylether.

Examples of di-$C_1$-$C_4$-alkyl-$C_2$-$C_6$-alkylene ethers are 1,2-dimethoxyethane, 1,2-diethoxyethane, diglyme (diethylene glycol dimethyl ether), triglyme (triethyleneglycol dimethyl ether), tetraglyme (tetraethyleneglycol dimethyl ether), and diethylenglycoldiethylether.

Examples of suitable polyethers are polyalkylene glycols, preferably poly-$C_1$-$C_4$-alkylene glycols and especially polyethylene glycols. Polyethylene glycols may comprise up to 20 mol % of one or more $C_1$-$C_4$-alkylene glycols in copolymerized form. Polyalkylene glycols are preferably dimethyl- or diethyl-end-capped polyalkylene glycols. The molecular weight $M_w$ of suitable polyalkylene glycols and especially of suitable polyethylene glycols may be at least 400 g/mol. The molecular weight $M_w$ of suitable polyalkylene glycols and especially of suitable polyethylene glycols may be up to 5 000 000 g/mol, preferably up to 2 000 000 g/mol.

Examples of cyclic ethers are 1,4-dioxane, tetrahydrofuran, and their derivatives like 2-methyl tetrahydrofuran.

Examples of acyclic acetals are 1,1-dimethoxymethane and 1,1-diethoxymethane. Examples of cyclic acetals are 1,3-dioxane, 1,3-dioxolane, and their derivatives such as methyl dioxolane.

Examples of acyclic orthocarboxylic acid esters are tri-$C_1$-$C_4$ alkoxy methane, in particular trimethoxymethane and triethoxymethane. Examples of suitable cyclic orthocarboxylic acid esters are 1,4-dimethyl-3,5,8-trioxabicyclo[2.2.2]octane and 4-ethyl-1-methyl-3,5,8-trioxabicyclo[2.2.2]octane.

Examples of acyclic esters of carboxylic acids are ethyl and methyl formiate, ethyl and methyl acetate, ethyl and methyl proprionate, and ethyl and methyl butanoate, and esters of dicarboxylic acids like 1,3-dimethyl propanedioate. An example of a cyclic ester of carboxylic acids (lactones) is γ-butyrolactone.

Examples of cyclic and acyclic sulfones are ethyl methyl sulfone, dimethyl sulfone, and tetrahydrothiophene-S,S-dioxide (sulfolane).

Examples of cyclic and acyclic nitriles and dinitriles are adipodinitrile, acetonitrile, propionitrile, and butyronitrile.

Viewed chemically, an electrolyte composition is any composition which comprises free ions and as a result is electrically conductive. The electrolyte composition functions as a medium that transfers ions participating in the electrochemical reaction taking place in an electrochemical cell. The most typical electrolyte composition is an ionic solution, although molten electrolyte compositions and solid electrolyte compositions are likewise possible. An electrolyte composition of the invention is therefore an electrically conductive medium, primarily due to the presence of at least one substance which is present in a dissolved and/or molten state, i.e., an electrical conductivity supported by movement of ionic species. In liquid or gel electrolyte compositions the conducting salt is usually solvated in the aprotic organic solvent(s).

The inventive electrolyte composition (A) may contain one or more conducting salts different from the compounds of formula (I). The conducting salt(s) different from the compounds of formula (I) are usually present in the electrolyte in the solvated or melted state. Preferably the conducting salt(s) different from the compounds of formula (I) are lithium salts. More preferred the conducting salt(s) different from the compounds of formula (I) are selected from the group consisting of Li[$F_{6-x}$P($C_y F_{2y+1}$)$_x$], wherein x is an integer in the range from 0 to 6 and y is an integer in the range from 1 to 20;

Li[B($R^I$)$_4$], Li[B($R^I$)$_2$(O$R^{II}$O)] and Li[B(O$R^{II}$O)$_2$] wherein each $R^I$ is independently from each other selected from F, Cl, Br, I, $C_1$-$C_4$ alkyl, $C_2$-$C_4$ alkenyl, $C_2$-$C_4$ alkynyl, O$C_1$-$C_4$ alkyl, O$C_2$-$C_4$ alkenyl, and O$C_2$-$C_4$ alkynyl wherein alkyl, alkenyl, and alkynyl may be substituted by one or more O$R^{III}$, wherein $R^{III}$, is selected from $C_1$-$C_6$ alkyl, $C_2$-$C_6$ alkenyl, and $C_2$-$C_6$ alkynyl, and (O$R^{II}$O) is a bivalent group derived from a 1,2- or 1,3-diol, a 1,2- or 1,3-dicarboxlic acid or a 1,2- or 1,3-hydroxycarboxylic acid, wherein the bivalent group forms a 5- or 6-membered cycle via the both oxygen atoms with the central B-atom;

LiClO$_4$; LiAsF$_6$; LiCF$_3$SO$_3$; Li$_2$SiF$_6$; LiSbF$_6$; LiAlCl$_4$, Li(N(SO$_2$F)$_2$), lithium tetrafluoro (oxalato) phosphate; lithium oxalate; and salts of the general formula Li[Z(C"$F_{2n+1}$SO$_2$)$_m$], where m and n are defined as follows:

m=1 when Z is selected from oxygen and sulfur,
m=2 when Z is selected from nitrogen and phosphorus,
m=3 when Z is selected from carbon and silicon, and
n is an integer in the range from 1 to 20.

Suited 1,2- and 1,3-diols from which the bivalent group (O$R^{II}$O) is derived may be aliphatic or aromatic and may be selected, e.g., from 1,2-dihydroxybenzene, propane-1,2-diol, butane-1,2-diol, propane-1,3-diol, butan-1,3-diol, cyclohexyl-trans-1,2-diol and naphthalene-2,3-diol which are optionally are substituted by one or more F and/or by at least one straight or branched non fluorinated, partly fluorinated or fully fluorinated $C_1$-$C_4$ alkyl group. An example for such 1,2- or 1,3-diole is 1,1,2,2-tetra(trifluoromethyl)-1,2-ethane diol.

"Fully fluorinated $C_1$-$C_4$ alkyl group" means, that all H-atoms of the alkyl group are substituted by F.

Suited 1,2- or 1,3-dicarboxlic acids from which the bivalent group (O$R^{II}$O) is derived may be aliphatic or aromatic, for example oxalic acid, malonic acid (propane-1,3-dicarboxylic acid), phthalic acid or isophthalic acid, preferred is oxalic acid. The 1,2- or 1,3-dicarboxlic acid are optionally substituted by one or more F and/or by at least one straight or branched non fluorinated, partly fluorinated or fully fluorinated $C_1$-$C_4$ alkyl group.

Suited 1,2- or 1,3-hydroxycarboxylic acids from which the bivalent group (O$R^{II}$O) is derived may be aliphatic or aromatic, for example salicylic acid, tetrahydro salicylic acid, malic acid, and 2-hydroxy acetic acid, which are optionally substituted by one or more F and/or by at least one straight or branched non fluorinated, partly fluorinated or fully fluorinated $C_1$-$C_4$ alkyl group. An example for such 1,2- or 1,3-hydroxycarboxylic acids is 2,2-bis(trifluoromethyl)-2-hydroxy-acetic acid.

Examples of Li[B($R^I$)$_4$], Li[B($R^I$)$_2$(O$R^{II}$O)] and Li[B(O$R^{II}$O)$_2$] are LiBF$_4$, lithium difluoro oxalato borate and lithium dioxalato borate.

Preferably the one or more conducting salts different from the compounds of formula (I) are selected from F-containing conducting lithium salts, more preferred from LiPF$_6$, LiBF$_4$, LiClO$_4$, LiN(SO$_2$C$_2$F$_5$)$_2$, LiN(SO$_2$CF$_3$)$_2$, LiN(SO$_2$F)$_2$, and LiPF$_3$(CF$_2$CF$_3$)$_3$, even more preferred they are selected from LiPF$_6$, LiBF$_4$, and LiN(SO$_2$CF$_3$)$_2$, and the most preferred the one or more conducting salt different from the compounds of formula (I) is LiPF$_6$.

The one or more conducting salts different from the compounds of formula (I) are is usually present at a minimum concentration of at least 0.1 mol/l, preferably the concentration of the one or more conducting salts different from the compounds of formula (I) is 0.5 to 2 mol/l based on the entire electrolyte composition.

The electrolyte composition (A) according to the present invention may contain at least one further additive different from the compounds of formula (I). This additive may be selected from polymers, SEI forming additives, flame retardants, overcharge protection additives, wetting agents, antigassing additives, additional HF and/or H$_2$O scavenger, stabilizer for LiPF$_6$ salt, ionic solvation enhancer, corrosion inhibitors, gelling agents, and the like.

Polymers may be added to electrolyte compositions containing a solvent or solvent mixture in order to convert liquid electrolytes into quasi-solid or solid electrolytes and thus to improve solvent retention, especially during ageing and to prevent leakage of solvent from the electrochemical cell. Examples for polymers used in electrolyte compositions are polyvinylidene fluoride, polyvinylidene-hexafluoropropylene copolymers, polyvinylidene-hexafluoropropylene-chlorotrifluoroethylene copolymers, Nafion, polyethylene oxide, polymethyl methacrylate, polyacrylonitrile, polypropylene, polystyrene, polybutadiene, polyethylene glycol, polyvinylpyrrolidone, polyaniline, polypyrrole and/or polythiophene.

Examples of flame retardants are organic phosphorus compounds like cyclophosphazenes, phosphoramides, alkyl and/or aryl tri-substituted phosphates, alkyl and/or aryl di- or tri-substituted phosphites, alkyl and/or aryl di-substituted phosphonates, alkyl and/or aryl tri-substituted phosphines, and fluorinated derivatives thereof.

Examples of HF and/or H$_2$O scavenger are optionally halogenated cyclic and acyclic silylamines, carbodiimides and isocyanates.

Examples of overcharge protection additives are cyclohexylbenzene, o-terphenyl, p-terphenyl, and biphenyl and the like, preferred are cyclohexylbenzene and biphenyl.

SEI forming additives are known to the person skilled in the art. An SEI forming additive according to the present invention is a compound which decomposes on an electrode to form a passivation layer on the electrode which prevents degradation of the electrolyte and/or the electrode. In this way, the lifetime of a battery is significantly extended. Preferably the SEI forming additive forms a passivation layer on the anode. An anode in the context of the present invention is understood as the negative electrode of a battery. Preferably, the anode has a reduction potential of 1 Volt or less vs. Li$^+$/Li redox couple, such as a graphite anode. In order to determine if a compound qualifies as anode film forming additive, an electrochemical cell can be prepared comprising a graphite electrode and a lithium-ion containing cathode, for example lithium cobalt oxide, and an electrolyte containing a small amount of said compound, typically from 0.01 to 10 wt.-% of the electrolyte composition, preferably from 0.05 to 5 wt.-% of the electrolyte composition.

Upon application of a small current between anode and cathode, the anode potential can be swept from open circuit potential (OCP) to the proximity of Li/Li$^+$ redox potential (e.g., 0.005V$_{Li}$). Reduction processes of the electrolyte solution components will be visible as peaks in the cell's differential capacity plot (derivative of capacity by potential, vs. potential). The onset potential, peak intensity and area of those peaks can be taken into consideration to determine whether an additive can be regarded as SEI forming additive. When comparing the differential capacity plots of a base electrolyte formulation and of the base formulation+ additive, an ideal SEI forming additive will have reduction peak (typically at higher voltages) of similar intensity and area of those appearing for the base electrolyte formulation in the first cycle; furthermore, the peak(s) intensity(ies) of the base electrolyte formulation shall be highly reduced or substantially modified in nature. If those requirements are fulfilled, the compound can be regarded as SEI forming additive. Some less efficient SEI forming additives may have much higher peak intensity and peak area, however the reduction/modification of the standard solution's peak intensity should be always be present.

Examples of SEI forming additives are vinylene carbonate and its derivatives such as vinylene carbonate and methylvinylene carbonate; fluorinated ethylene carbonate and its derivatives such as monofluoroethylene carbonate, cis- and trans-difluorocarbonate; propane sultone and its derivatives; ethylene sulfite and its derivatives; oxalate comprising compounds such as lithium oxalate, oxalato borates including dimethyl oxalate, lithium bis(oxalate) borate, lithium difluoro (oxalato) borate, and ammonium bis(oxalato) borate, and oxalato phosphates including lithium tetrafluoro (oxalato) phosphate; and ionic compounds containing a compound of formula (II)

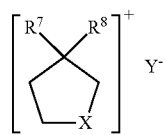

(II)

wherein
X is CH$_2$ or NR$^a$,
R$^7$ is selected from C$_1$ to C$_6$ alkyl,
R$^8$ is selected from —(CH$_2$)$_u$—SO$_3$—(CH$_2$)$_v$—R$^b$, —SO$_3$— is —O—S(O)$_2$— or —S(O)$_2$—O—, preferably —SO$_3$— is —O—S(O)$_2$—,
u is an integer from 1 to 8, preferably u is 2, 3 or 4, wherein one or more CH$_2$ groups of the —(CH$_2$)$_u$— alkylene chain which are not directly bound to the N-atom and/or the SO$_3$ group may be replaced by O and wherein two adjacent CH$_2$ groups of the —(CH$_2$)$_u$— alkylene chain may be replaced by a C—C double bond, preferably the —(CH$_2$)$_u$— alkylene chain is not substituted and u
u is an integer from 1 to 8, preferably u is 2, 3 or 4,
v is an integer from 1 to 4, preferably v is 0,
R$^a$ is selected from C$_1$ to C$_6$ alkyl, R$^b$ is selected from C$_1$-C$_{20}$ alkyl, C$_2$-C$_{20}$ alkenyl, C$_2$-C$_{20}$ alkynyl, C$_6$-C$_{12}$ aryl, and C$_6$-C$_{24}$ aralkyl, which may contain one or more F, and wherein one or more CH$_2$ groups of alkyl, alkenyl, alkynyl and aralkyl which are not directly bound to the SO$_3$ group may be replaced by O, preferably R$^b$ is selected from C$_1$-C$_6$ alkyl, C$_2$-C$_4$ alkenyl, and C$_2$-C$_4$ alkynyl, which may contain one or more F, and wherein one or more CH$_2$ groups of alkyl, alkenyl, alkynyl and aralkyl which are not directly bound to the SO$_3$ group may be replaced by O, preferred examples of R$^b$ include methyl, ethyl, trifluoromethyl, pentafluoroethyl, n-propyl, n-butyl, n-hexyl, ethenyl, ethynyl, allyl or prop-1-yn-yl, and an anion Y$^-$ selected from bisoxalato borate, difluoro (oxalato) borate, [F$_z$B(C$_m$F$_{2m+1}$)$_{4-z}$]$^-$, [F$_y$P(C$_m$F$_{2m+1}$)$_{6-y}$]$^-$, (C$_m$F$_{2m+1}$)$_2$P(O)O]$^-$, [C$_m$F$_{2m+1}$P(O)O$_2$]$^{2-}$, [O—C(O)—C$_m$F$_{2m+1}$]$^-$, [O—S(O)$_2$—C$_m$F$_{2m+1}$]$^-$, [N(C(O)—C$_m$F$_{2m+1}$)$_2$]$^-$, [N(S(O)$_2$—C$_m$F$_{2m+1}$)$_2$]$^-$, [N(C(O)—C$_m$F$_{2m+1}$)(S(O)$_2$—C$_m$F$_{2m+1}$)]$^-$, [N(C(O)—C$_m$F$_{2m+1}$)(C(O)F)]$^-$, [N(S(O)$_2$—C$_m$F$_{2m+1}$)(S(O)$_2$F)]$^-$, [N(S(O)$_2$F)$_2$]$^-$, [C(C(O)—C$_m$F$_{2m+1}$)$_3$]$^-$, [C(S(O)$_2$—C$_m$F$_{2m+1}$)$_3$]$^-$, wherein m is an integer from 1 to 8, z is an integer from 1 to 4, and y is an integer from 1 to 6, Preferred anions Y$^-$ are bisoxalato borate, difluoro (oxalato) borate, [F$_3$B(CF$_3$)]$^-$, [F$_3$B(C$_2$F$_5$)]$^-$, [PF$_6$]$^-$, [F$_3$P(C$_2$F$_5$)$_3$]$^-$, [F$_3$P(C$_3$F$_7$)$_3$]$^-$, [F$_3$P(C$_4$F$_9$)$_3$]$^-$, [F$_4$P(C$_2$F$_5$)$_2$]$^-$, [F$_4$P(C$_3$F$_7$)$_2$]$^-$, [F$_4$P(C$_4$F$_9$)$_2$]$^-$, [F$_5$P(C$_2$F$_5$)]$^-$, [F$_5$P(C$_3$F$_7$)]$^-$ or [F$_5$P(C$_4$F$_9$)]$^-$, [(C$_2$F$_5$)$_2$P(O)O]$^-$, [(C$_3$F$_7$)$_2$P(O)O]$^-$ or [(C$_4$F$_9$)$_2$P(O)O]$^-$. [C$_2$F$_5$P(O)O$_2$]$^{2-}$, [C$_3$F$_7$P(O)O$_2$]$^{2-}$, [C$_4$F$_9$P(O)O$_2$]$^{2-}$, [O—C(O)CF$_3$]$^-$, [O—C(O)C$_2$F$_5$]$^-$, [O—C(O)C$_4$F$_9$]$^-$, [O—S(O)$_2$CF$_3$]$^-$, [O—S(O)$_2$C$_2$F$_5$]$^-$, [N(C(O)C$_2$F$_5$)$_2$]$^-$, [N(C(O)(CF$_3$)$_2$]$^-$, [N(S(O)$_2$CF$_3$)$_2$]$^-$, [N(S(O)$_2$C$_2$F$_5$)$_2$]$^-$, [N(S(O)$_2$C$_3$F$_7$)$_2$]$^-$, [N(S(O)$_2$CF$_3$)(S(O)$_2$C$_2$F$_5$)]$^-$, [N(S(O)$_2$C$_4$F$_9$)$_2$]$^-$, [N(C(O)CF$_3$)(S(O)$_2$CF$_3$)]$^-$, [N(C(O)C$_2$F$_5$)(S(O)$_2$CF$_3$)]$^-$ or [N(C(O)CF$_3$)(S(O)$_2$—C$_4$F$_9$)]$^-$, [N(C(O)CF$_3$)(C(O)F)]$^-$, [N(C(O)C$_2$F$_5$)(C(O)F)]$^-$, [N(C(O)C$_3$F$_7$)(C(O)F)]$^-$, [N(S(O)$_2$CF$_3$)(S(O)$_2$F)]$^-$, [N(S(O)$_2$C$_2$F$_5$)(S(O)$_2$F)]$^-$, [N(S(O)$_2$C$_4$F$_9$)(S(O)$_2$F)]$^-$, [C(C(O)CF$_3$)$_3$]$^-$, [C(C(O)C$_2$F$_5$)$_3$]$^-$ or [C(C(O)C$_3$F$_7$)$_3$]$^-$, [C(S(O)$_2$CF$_3$)$_3$]$^-$, [C(S(O)$_2$C$_2$F$_5$)$_3$]$^-$, and [C(S(O)$_2$C$_4$F$_9$)$_3$]$^-$.

More preferred the anion Y$^-$ is selected from bisoxalato borate, difluoro (oxalato) borate, CF$_3$SO$_3$, and [PF$_3$(C$_2$F$_5$)$_3$]$^-$.

Compounds of formula (II) are described in WO 2013/026854 A1.

Preferred SEI-forming additives are oxalato borates, fluorinated ethylene carbonate and its derivatives, vinylene carbonate and its derivatives, and compounds of formula (II). More preferred are lithium bis(oxalato) borate (Li-BOB), vinylene carbonate, monofluoro ethylene carbonate, and compounds of formula (II), in particular monofluoro ethylene carbonate, and compounds of formula (II).

A compound added as additive may have more than one effect in the electrolyte composition and the device comprising the electrolyte composition. E.g. lithium oxalato borate may be added as additive enhancing the SEI formation but it may also be added as conducting salt.

According to a preferred embodiment of the present invention the electrolyte composition contains at least one SEI forming additive, all as described above or as described as being preferred.

In one embodiment of the present invention, the electrolyte composition (A) contains:
(i) at least one compound of formula (I);
(ii) at least one organic aprotic solvent;
(iii) at least one conducting salt different from the compounds of formula (I); and (iv) optionally at least one additive different from the compounds of formula (I).

The electrolyte composition (A) preferably contains components (i) to (iv) in the following con-centrations ranges (i) 0.005 to 10 wt.-% of at least one compound of formula (I);
(ii) at least 65 wt.-% of at least one organic aprotic solvent;
(iii) 0.1 to 25 wt.-% of at least one conducting salt different from the compounds of formula (I); and
(iv) 0 to 25 wt.-% of at least one additive different from the compounds of formula (I); based on the total weight of the electrolyte composition.

The electrolyte composition is non-aqueous. The water content of the inventive electrolyte composition is preferably below 100 ppm, based on the weight of the electrolyte composition, more preferred below 50 ppm, most preferred below 30 ppm. The water content may be determined by titration according to Karl Fischer, e.g. described in detail in DIN 51777 or ISO760: 1978.

The electrolyte composition contains preferably less than 50 ppm HF, based on the weight of the electrolyte composition, more preferred less than 40 ppm HF, most preferred less than 30 ppm HF. The HF content may be determined by titration according to potentiometric or potentiographic titration method or ion chromatography.

The electrolyte composition described above is preferably liquid at working conditions; more preferred it is liquid at 1 bar and 25° C., even more preferred the electrolyte composition is liquid at 1 bar and −15° C., in particular the electrolyte composition is liquid at 1 bar and −30° C., even more preferred the electrolyte composition is liquid at 1 bar and −50° C.

The present invention also provides a method for improving the performance of electrochemical cells by adding at least one compound of formula (I) to the electrolyte composition, in particular for improving the performance of high voltage cathodes in electrochemical cells, i.e. a method for stabilizing high voltage cathodes in electrochemical cells by adding at least one compound of formula (I) to the electrolyte composition. The additives are added to generate a passivation layer on the cathode.

The electrolyte compositions described herein may be prepared by methods known to the person skilled in the field of the production of electrolytes, generally by dissolving the conducting salt in the corresponding solvent mixture, adding the compound(s) of the formula (I) according to the invention, and optionally additional additives, as described above.

A possible preparation process of the inventive electrolyte compositions comprises the steps a) providing at least one organic aprotic solvent;
b) adding together or independently from each other the at least one compound of formula (I), optionally one or more conducting salts different from the compounds of formula (I), and optionally one or more additives different from different from the compounds of formula (I).

The electrolyte compositions described above are used in electrochemical cells like lithium batteries, double layer capacitors, and lithium ion capacitors, preferably the inventive electrolyte compositions are used in lithium batteries, more preferred in secondary lithium batteries and most preferred in lithium ion batteries.

The invention further provides an electrochemical cell comprising the electrolyte composition (A) as described above or as described as being preferred. The electrochemical cell comprises (A) the electrolyte composition as described above,
(B) at least one cathode comprising a cathode active material, and
(C) at least one anode comprising an anode active material.

The electrochemical cell may be a lithium battery, a double layer capacitor, or a lithium ion capacitor. The general construction of such electrochemical devices is known and is familiar to the person skilled in this art—for batteries, for example, in Linden's Handbook of Batteries (ISBN 978-0-07-162421-3).

Preferably the electrochemical cell is a lithium battery. The term "lithium battery" as used herein means an electrochemical cell, wherein the anode comprises lithium metal or lithium ions sometime during the charge/discharge of the cell. The anode may comprise lithium metal or a lithium metal alloy, a material occluding and releasing lithium ions like graphite, or other lithium containing compounds; e.g. the lithium battery may be a lithium ion battery, a lithium/sulphur battery, or a lithium/selenium sulphur battery. The lithium battery is preferably a secondary lithium battery, i.e. a rechargeable lithium battery.

In particular preferred the electrochemical device is a lithium ion battery, i.e. a secondary lithium ion electrochemical cell comprising a cathode comprising a cathode active material that can reversibly occlude and release lithium ions and an anode comprising an anode active material that can reversibly occlude and release lithium ions.

The at least one cathode active material preferably comprises a material capable of occluding and releasing lithium ions selected from lithiated transition metal phosphates and lithium ion intercalating metal oxides.

Examples of lithiated transition metal phosphates are $LiFePO_4$ and $LiCoPa_4$, examples of lithium ion intercalating metal oxides are $LiCoO_2$, $LiNiO_2$, mixed transition metal oxides with layer structure having the general formula $Li_{(1+z)}[Ni_aCo_bMn_c]_{(1-z)}O_{2+e}$ wherein z is 0 to 0.3; a, b and c may be same or different and are independently 0 to 0.8 wherein a+b+c=1; and −0.1≤e≤0.1, and manganese-containing spinels like $LiMnO_4$ and spinels of general formula $Li_{1+d}M_{2-t}O_{4-d}$ wherein d is 0 to 0.4, t is 0 to 0.4 and M is Mn and at least one further metal selected from the group consisting of Co and Ni, and $Li_{(1+g)}[Ni_hCo_iAl_j]_{(1-g)}O_{2+k}$. Typical values for g, h, l, j and k are: g=0, h=0.8 to 0.85, i=0.15 to 0.20, j=0.02 to 0.03 and k=0.

The cathode may further comprise electrically conductive materials like electrically conductive carbon and usual components like binders. Compounds suited as electrically conductive materials and binders are known to the person skilled in the art. For example, the cathode may comprise carbon in a conductive polymorph, for example selected from graphite, carbon black, carbon nanotubes, graphene or mixtures of at least two of the aforementioned substances. In addition, the cathode may comprise one or more binders, for example one or more organic polymers like polyethylene, polyacrylonitrile, polybutadiene, polypropylene, polystyrene, polyacrylates, polyvinyl alcohol, polyisoprene and copolymers of at least two comonomers selected from ethylene, propylene, styrene, (meth)acrylonitrile and 1,3-butadiene, especially styrene-butadiene copolymers, and halogenated (co)polymers like polyvinlyidene chloride, polyvinyl chloride, polyvinyl fluoride, polyvinylidene fluoride (PVdF), polytetrafluoroethylene, copolymers of tetrafluoroethylene and hexafluoropropylene, copolymers of tetrafluoroethylene and vinylidene fluoride and polyacrylnitrile.

The anode comprised within the lithium batteries of the present invention comprises an anode active material that can reversibly occlude and release lithium ions or is capable to form an alloy with lithium. In particular carbonaceous material, i.e. material containing carbon, that can reversibly occlude and release lithium ions can be used as anode active material. Carbonaceous materials suited are crystalline carbon such as a graphite material, more particularly, natural graphite, graphitized cokes, graphitized MCMB, and graphitized MPCF; amorphous carbon such as coke, mesocarbon microbeads (MCMB) fired below 1500° C., and mesophase pitch-based carbon fiber (MPCF); hard carbon and carbonic anode active material (thermally decomposed carbon, coke, graphite) such as a carbon composite, combusted organic polymer, and carbon fiber.

Further anode active materials are lithium metal, or materials containing an element capable of forming an alloy with lithium. Non-limiting examples of materials containing an element capable of forming an alloy with lithium include a metal, a semimetal, or an alloy thereof. It should be understood that the term "alloy" as used herein refers to both alloys of two or more metals as well as alloys of one or more metals together with one or more semimetals. If an alloy has metallic properties as a whole, the alloy may contain a nonmetal element. In the texture of the alloy, a solid solution, an eutectic (eutectic mixture), an intermetallic compound or two or more thereof coexist. Examples of such metal or semimetal elements include, without being limited to, titanium (Ti), tin (Sn), lead (Pb), aluminum, indium (In), zinc (Zn), antimony (Sb), bismuth (Bi), gallium (Ga), germanium (Ge), arsenic (As), silver (Ag), hafnium (Hf), zirconium (Zr) yttrium (Y), and silicon (Si). Metal and semimetal elements of Group 4 or 14 in the long-form periodic table of the elements are preferable, and especially preferable are silicon and tin, in particular silicon. Examples of tin alloys include ones having, as a second constituent element other than tin, one or more elements selected from the group consisting of silicon, magnesium (Mg), nickel, copper, iron, cobalt, manganese, zinc, indium, silver, titanium (Ti), germanium, bismuth, antimony and chromium (Cr). Examples of silicon alloys include ones having, as a second constituent element other than silicon, one or more elements selected from the group consisting of tin, magnesium, nickel, copper, iron, cobalt, manganese, zinc, indium, silver, titanium, germanium, bismuth, antimony and chromium.

A further possible anode active material are silicon based materials. Silicon based materials include silicon itself, e.g. amorphous and crystalline silicon, silicon containing compounds, e.g. $SiO_x$ with $0<x<1.5$ and Si alloys, and compositions containing silicon and/or silicon containing compounds, e.g. silicon/graphite composites and carbon coated silicon containing materials. Silicon itself may be used in different forms, e.g. in the form of nanowires, nanotubes, nanoparticles, films, nanoporous silicon or silicon nanotubes. The silicon may be deposited on a current collector. Current collector may be selected from coated metal wires, a coated metal grid, a coated metal web, a coated metal sheet, a coated metal foil or a coated metal plate. Preferably, current collector is a coated metal foil, e.g. a coated copper foil. Thin films of silicon may be deposited on metal foils by any technique known to the person skilled in the art, e.g. by sputtering techniques. One method of preparing thin silicon film electrodes are described in R. Elazari et al.; Electrochem. Comm. 2012, 14, 21-24.

Other possible anode active materials are lithium ion intercalating oxides of Ti.

Preferably the anode active material is selected from carbon containing material that can reversibly occlude and release lithium ions, particularly preferred the carbon containing material that can reversibly occlude and release lithium ions is selected from crystalline carbon, hard carbon and amorphous carbon, in particular preferred is graphite. In another preferred embodiment the anode active is selected from silicon containing material that can reversibly occlude and release lithium ions, preferably the anode comprises a thin film of silicon or a silicon/carbon composite. In a further preferred embodiment the anode active is selected from tin containing materials.

The anode and cathode may be made by preparing an electrode slurry composition by dispersing the electrode active material, a binder, optionally a conductive material and a thickener, if desired, in a solvent and coating the slurry composition onto a current collector. The current collector may be a metal wire, a metal grid, a metal web, a metal sheet, a metal foil or a metal plate. Preferred the current collector is a metal foil, e.g. a copper foil or aluminum foil.

The electrochemical cells may contain further constituents customary per se, for example separators, housings, cable connections etc. The housing may be of any shape, for example cuboidal or in the shape of a cylinder, the shape of a prism or the housing used is a metal-plastic composite film processed as a pouch. Suited separators are for example glass fiber separators and polymer-based separators like polyolefin separators.

Several electrochemical cells may be combined with one another, for example in series connection or in parallel connection. Series connection is preferred. The present invention further provides for the use of inventive electrochemical cells as described above in devices, especially in mobile devices. Examples of mobile devices are vehicles, for example automobiles, bicycles, aircraft, or water vehicles such as boats or ships. Other examples of mobile devices are those which are portable, for example computers, especially laptops, telephones or electrical power tools, for example from the construction sector, especially drills, battery-driven screwdrivers or battery-driven tackers. But the electrochemical cells can also be used for stationary energy stores.

Even without further statements, it is assumed that a skilled person is able to utilize the above description in its widest extent. Consequently, the preferred embodiments and examples are to be interpreted merely as a descriptive enclosure which in no way has any limiting effect at all.

The invention is illustrated by the examples which follow, which do not, however, restrict the invention.

1. Synthesis 1.1 Lithium catechol dimethyl borate $(Li^+[B(OCH_3)_2(OC_6H_4O)]^-)$

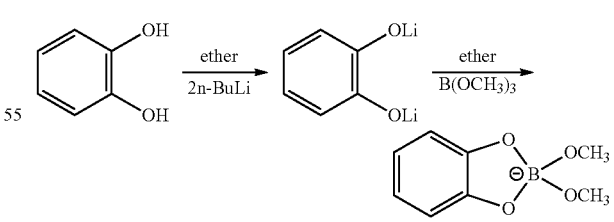

2.75 g of catechol (99%, Aldrich) was dissolved in 100 mL of ether. 30 mL of n-butyl lithium (1.6 mol·dm$^{-3}$ solution in hexane, ACRÖS) was added to the solution drop by drop. The reaction mixture was stirred for 24 hours and filtered in a $N_2$-filled glove-box. The salt obtained was subsequently washed with small amount of ether. Salt was kept under vacuum overnight. The product is characterized as lithium catechol by $^1$H. 1.25 g of lithium catechol was taken in a flask with 50 mL of ether, and 3 mL of trimethyl borate was added in it. A slurry mixture was obtained. After solution was stirred for 24 hours, the mixture was filtered in the $N_2$-filled glove box. The white solid obtained was dissolved in excess dimethyl carbonate (DMC), and then the mixture was filtered. Filtrate was collected and vacuum manifold was used to remove all the DMC. A white crystal product was obtained. The product was characterized by $^1$H and $^{11}$B nuclear magnetic resonance (NMR) spectroscopy.

1.2 Lithium bis(catechol) borate ($Li^+[B(O(C_6H_4)O)_2]^-$)

2.75 g of catechol (99%, Aldrich) was dissolved in 100 mL of ether. 30 mL of n-butyl lithium (1.6 mol·dm$^{-3}$ solution in hexane, ACRÖS) was added to the solution drop by drop. The reaction mixture was stirred for 24 hours and filtered in a $N_2$-filled glove-box. The salt obtained was subsequently washed with small amount of ether. Salt was kept under vacuum overnight. The product is characterized as lithium catechol by $^1$H NMR spectroscopy.

1.3 Lithium tetramethyl borate ($Li^+[B(OCH_3)_4]^-$)

A flask was charged with 2.1 g of trimethyl borate (98%, STREM CHEMICALS) in an excess of diethyl ether (anhydrous, ACROS). To this solution was added 9 ml of lithium methoxide solution (2.2 M in methanol, pure, ACROS). The mixture was stirred for an hour and the solid was separated by filtration. The solid lithium tetramethyl borate (LTMB, $LiB(OCH_3)_4$) was washed with diethyl ether and dimethyl carbonate and isolated by filtration. The residual solvent was removed by vacuum. The product was characterized by 1H, 13C and 11B nuclear magnetic resonance (NMR, Bruker) spectroscopy.

2. Electrolyte Compositions

An electrolyte composition containing 1.2 M $LiPF_6$, ethylene carbonate (EC), and ethyl methyl carbonate (EMC) (3/7 by volume) was prepared. To this base electrolyte composition lithium 0.5 wt.-% catechol dimethyl borate, lithium tetramethyl borate or lithium bis(catechol) borate was added, respectively. The different electrolyte compositions are displayed in Table 1.

TABLE 1

Electrolyte compositions

| Example | Borate additive |
| --- | --- |
| Comparative Example 1 | none |
| Comparative Example 2 | Lithium bis(catechol) borate $Li^+[B(O(C_6H_4)O)_2]^-$ |
| Comparative Example 3 | Lithium tetramethyl borate $Li^+[B(OCH_3)_4]^-$ |
| Working Example 1 | Lithium catechol dimethyl borate $Li^+[B(OCH_3)_2(O(C_6H_4)O)]^-$ |

3. Evaluation of Electrochemical Performance of the Electrolyte Compositions 3.1 Electrochemical Cells Coin cells were assembled with 2032-type coin cell parts. The cells were built with $LiNi_{0.5}Mn_{1.5}O_4$ as cathode active material (BASF), graphite as anode active material and a polyolefin separator. The coin cells were filled with 50 μL of electrolyte composition in an Argon-filled glove box. The water content was smaller than 0.1 ppm.

3.2 Electrochemical Testing

The cells were cycled at 55° C. at the C/5 D/5 (charge over 5 hours and discharge over 5 hours) rate on Arbin potentiostats following a CC—CV protocol. A constant current (CC) charge was applied to reach the desired potential. This potential was maintained (CV) until the current decreased down to 10% of the applied charging current for a maximum duration of 1 hour. The temperature of cycling was controlled by Fisher Scientific Isotemp Incubators. Formation cycling of graphite cells at 25° C. was as follows: In total 5 cycles, 1 cycle at C/20 D/20 rate, 2 cycles at C/10 D/10, and 2 cycles at C/5 D/5 rate at 25° C. The remaining cycles were performed at a cycling rate of C/5 D/5. After 5 cycles the temperature was raised to 55° C. The development of the specific capacities and the coulomb efficiencies are shown below in Tables 2 and 3. The coulomb efficiency is calculated as discharge capacity divided by the charge capacity of the same cycle.

TABLE 2

Specific capacities

| | | Specific capacities [mAh · g$^{-1}$] | | | |
| --- | --- | --- | --- | --- | --- |
| Cycle # | T [° C.] | Comparative example 1 (no additive) | Inventive example 1 $Li^+[B(OCH_3)_2(O(C_6H_4)O)]^-$ | Comparative example 2 $Li^+[B(O(C_6H_4)O)_2]^-$ | Comparative example 3 $Li^+[B(OCH_3)_4]^-$ |
| 1 | 25 | 117.4 | 106.9 | 107.8 | 43.5 |
| 5 | 25 | 107.4 | 109.9 | 116.3 | 32.4 |
| 6 | 55 | 106.7 | 109.4 | 115.3 | 32.7 |
| 10 | 55 | 105.0 | 108.7 | 112.9 | 34.8 |
| 20 | 55 | 104.2 | 111.0 | 108.8 | 40.6 |
| 30 | 55 | 96.1 | 97.1 | 81.2 | 38.1 |
| 40 | 55 | 85.5 | 89.81 | 67.3 | 27.0 |
| 50 | 55 | 76.1 | 83.0 | 61.3 | 24.3 |

TABLE 3

Coulomb efficiencies

| | | Coulomb efficiency | | | |
| --- | --- | --- | --- | --- | --- |
| Cycle # | T [° C.] | Comparative example 1 (no additive) | Inventive example 1 $Li^+[B(OCH_3)_2(O(C_6H_4)O)]^-$ | Comparative example 2 $Li^+[B(O(C_6H_4)O)_2]^-$ | Comparative example 3 $Li^+[B(OCH_3)_4]^-$ |
| 1 | 25 | 0.511 | 0.741 | 0.520 | 0.678 |
| 5 | 25 | 0.907 | 0.981 | 0.928 | 0.968 |
| 6 | 55 | 0.903 | 0.982 | 0.941 | 0.971 |
| 10 | 55 | 0.915 | 0.989 | 0.952 | 0.978 |
| 20 | 55 | 0.960 | 0.992 | 0.985 | 0.986 |
| 30 | 55 | 0.961 | 0.984 | 0.912 | 0.959 |
| 40 | 55 | 0.969 | 0.988 | 0.876 | 0.972 |
| 50 | 55 | 0.966 | 0.988 | 0.883 | 0.976 |

As can be seen from Tables 2 and 3, the inventive electrochemical cell containing the electrolyte composition with lithium catechol dimethyl borate shows better specific capacities and coulomb efficiencies during cycling at 55° C. than the electrochemical cells containing electrolyte compositions without a borate additive or the symmetric borate additives lithium tetramethyl borate and lithium bis(catechol) borate.

The invention claimed is:

1. An electrolyte composition, comprising at least one aprotic organic solvent and at least one compound of formula (I):

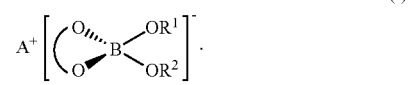

(I)

wherein:
A⁺ is selected from the group consisting of Li⁺, Na⁺, K⁺, Cs⁺, and ammonium;

is a bidentate radical derived from a (hetero)aromatic 1,2-, 1,3- or 1,4-diol, from a (hetero)aromatic 1,2-, 1,3- or 1,4-dicarboxylic acid or from a (hetero)aromatic 1,2-, 1,3- or 1,4-hydroxycarboxylic acid by abstracting the two H atoms of pairs of adjacent OH groups; and $R^1$ and $R^2$ are independently selected from the group consisting of $C_1$ to $C_{10}$ alkyl, $C_2$ to $C_{10}$ alkenyl, $C_2$ to $C_{10}$ alkynyl, $C_3$ to $C_{10}$ cycloalkyl, and $C_5$ to $C_{14}$ (hetero)aryl, wherein alkyl, alkenyl, alkynyl, cycloalkyl, and (hetero)aryl may be substituted by one or more substituents selected from F, CN, and optionally fluorinated groups selected from $C_1$ to $C_4$ alkyl, $C_2$ to $C_4$ alkenyl, $C_2$ to $C_4$ alkynyl, phenyl, and benzyl.

2. The electrolyte composition according to claim 1, wherein $R^1$ and $R^2$ are independently a $C_1$ to $C_{10}$ alkyl, which may be substituted by one or more substituents selected from the group consisting of F and CN.

3. The electrolyte composition according to claim 1, wherein:

is a bidentate radical derived from a (hetero)aromatic 1,2-diol, from a (hetero)aromatic 1,2-dicarboxylic acid or from a (hetero)aromatic 1,2-hydroxycarboxylic acid by abstracting the two H atoms of pairs of adjacent OH groups.

4. The electrolyte composition according to claim 1, wherein the bivalent radical

is derived from catechol, salicylic acid or phthalic acid.

5. The electrolyte composition according to claim 1, wherein A⁺ is selected from the group consisting of Li⁺ and ammonium.

6. The electrolyte composition according to claim 1, wherein:

is a bidentate radical derived from a (hetero)aromatic 1,2-diol, from a (hetero)aromatic 1,2-dicarboxylic acid or from a (hetero)aromatic 1,2-hydroxycarboxylic acid by abstracting the two H atoms of pairs of adjacent OH groups, and $R^1$ and $R^2$ are selected independently from $C_1$ to $C_4$ alkyl, which may be substituted by one or more substituents selected from F and CN.

7. The electrolyte composition according to claim 1, wherein:
the bidentate radical

is derived from catechol, salicylic acid and phthalic acid;
$R^1$ and $R^2$ are each independently selected from $C_1$ to $C_4$ alkyl; and
A⁺ is selected from Li⁺ and ammonium.

8. The electrolyte composition according to claim 1, wherein the at least one compound of formula (I) is lithium dimethyl catechol borate.

9. The electrolyte composition according to claim 1, comprising al 0.005 to 10 wt.-% of the at least one compound of formula (I), based on a total weight of the electrolyte composition.

10. The electrolyte composition according to claim 1, further comprising at least one conducting salt that is different from the at least one compound of formula (I).

11. The electrolyte composition according to claim 1, further comprising at least one further additive that is different from the at least one compound of formula (I).

12. The electrolyte composition according to claim 1, wherein the at least one aprotic organic solvent is selected from the group consisting of cyclic and acyclic organic carbonates, di-$C_1$-$C_{10}$-alkylethers, di-$C_1$-$C_4$-alkyl-$C_2$-$C_6$-alkylene ethers and polyethers, cyclic ethers, cyclic and acyclic acetales and ketales, orthocarboxylic acids esters, cyclic and acyclic esters and diesters of carboxylic acids, cyclic and acyclic sulfones, and cyclic and acyclic nitriles and dinitriles.

13. The electrolyte composition according to claim 1, wherein when A⁺ is ammonium, the ammonium is a quaternary organic $[NR^3R^4R^5R^6]^+$ wherein $R^3$, $R^4$, $R^5$, and $R^6$ are selected independently from H, $C_1$ to $C_{10}$ alkyl, $C_2$ to $C_{10}$ alkenyl, $C_2$ to $C_{10}$ alkynyl, $C_3$ to $C_{10}$ cycloalkyl, and $C_5$ to $C_{14}$ (hetero)aryl, and wherein two of $R^3$, $R^4$, $R^5$, and $R^6$ are linked and jointly selected from a 4- to 5-membered hydrocarbon group forming together with the central N-atom a five- or six-membered heterocycle wherein one or more members of the 4- to 5-membered hydrocarbon group are optionally replaced by one or more O, S or NR', where R' is selected from H and $C_1$-$C_{10}$ alkyl.

14. A process for forming the electrolyte composition of claim 1, the process comprising adding the at least one compound of formula (I) to the at least one aprotic organic solvent.

15. An electrochemical cell, comprising:
(A) the electrolyte composition of claim 1;
(B) at least one cathode comprising a cathode active material; and
(C) at least one anode comprising an anode active material.

16. The electrochemical cell according to claim 15, wherein the electrochemical cell is a secondary lithium battery.

17. The lithium ion battery according to claim 15, wherein the anode active material comprises silicon, tin or carbon.

18. The lithium ion battery according to claim 15, wherein the at least one cathode active material comprises a material capable of occluding and releasing lithium ions selected from lithiated transition metal phosphates and lithium ion intercalating transition metal oxides.

* * * * *